May 10, 1927.
R. H. WHITELEGG
STEAM LOCOMOTIVE
Filed April 29, 1926
1,628,016
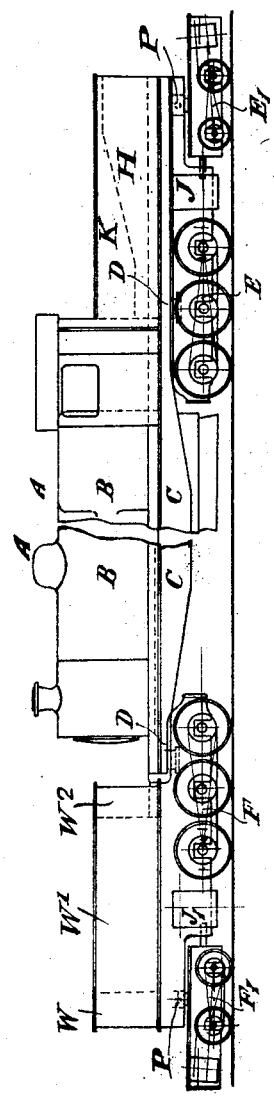

Patented May 10, 1927.

1,628,016

UNITED STATES PATENT OFFICE.

ROBERT HARBEN WHITELEGG, OF MANCHESTER, ENGLAND.

STEAM LOCOMOTIVE.

Application filed April 29, 1926, Serial No. 105,521, and in Great Britain April 17, 1925.

This invention relates to improvements in steam locomotives and has particular reference to articulated locomotives comprising a boiler unit with water and fuel tanks, and two power driven groups of wheels, the said boiler unit being flexibly attached to and carried by the frameworks of the power driven groups of wheels.

The object of the present invention is to effect improvements in the construction of locomotives to provide an articulating locomotive comprising a boiler unit carrying tanks and having a carrier frame provided with a bogie pivot center at each end beyond the boiler, a power unit and a power driven group of driving wheels, in which the power unit is provided with tanks arranged beyond the end of the boiler unit and connected to one of the pivot centers of the carrier frame while the other pivot center of the carrier frame is connected with a power driven group of wheels and said power driven groups of wheels is provided with an additional power driven group of wheels flexibly pivoted thereto whereby the stability of the locomotive is materially increased and the load is uniformly distributed over the power driven groups of wheels.

The driving sources may be reciprocating piston engines or turbines or other steam motor or any combination thereof and may be "simple" or "compound" as desired.

Condensers may be provided at any part of the locomotive, in lieu of, or in addition to water tanks and such condensers may be of any form or system.

Water tanks or fuel tanks, or condensers or any combination thereof may be provided on separate vehicles or tenders.

The locomotive may be provided with power generators, or converters at any convenient part. The term "power generator or converter" is intended to cover methods of driving the locomotive such as by means of a turbine-dynamo generator driving electric motors on the axles of the driving wheels or turbo hydraulic transmission.

The power driven groups of wheels or power driven units or both may be provided with carrying or bogie wheels and the size number and position of such wheels as also the size number and position of driving or coupled wheels may be as desired.

The invention may be applied to locomotives designed for use in conjunction with rack rails, centre rails and the like.

It will be understood that the term "power driven unit" indicates one or more power driven groups of wheels with frameworks, driving mechanism and the like, and to which are attached as integral parts, water tanks or fuel tanks or condensers, or any combination of these, thus forming a separate unit.

Devices for controlling the side movement of the power driven groups or units may be provided as desired.

With the above and other objects in view, the invention consists in the construction, combination and arrangement of devices hereinafter described and claimed.

The drawing is a diagrammatic elevation of a locomotive constructed and arranged in accordance with my invention.

In the drawing which illustrates one embodiment of the invention, A is the boiler unit, with boiler B, carrier frame C, and pivot centres D, the said pivot centres being attached to the frameworks of the power driven group of wheels E, and the power driven unit F, which in this instance are shown at the rear and front of the boiler respectively; W is the water tank forming part of the unit F, $W^1$ a condenser and $W^2$ a fuel tank, and H indicates the fuel tank or fuel and water tank and K a condenser carried on the frame of the boiler unit A.

The power driven group of wheels or power driven units or both are provided with any number of additional power driven groups of wheels or additional power driven units or both, to give increased power to the locomotive from the boiler when called for as in going up an incline. Additional power driven groups of wheels $E^1$ and $F^1$ are flexibly connected by vertical pivots P to E and F at J and $J^1$, the frameworks of the group E and unit F extending over and being supported upon the frameworks of the additional groups $E^1$ and $F^1$ as shown.

Auxiliary water or fuel tanks may be provided as described.

What I claim and desire to secure by Letters Patent is:—

1. An articulated locomotive comprising a boiler unit carrying tanks and having a carrier frame provided with a bogie pivot center at each end beyond the boiler, a power unit and a power driven group of driving wheels, the power unit being provided with tanks arranged beyond the end of the boiler unit and connected to one of the pivot centers of the carrier frame while the other pivot center of the carrier frame is connected to the power driven group of wheels, said power driven group of wheels being provided with an additional power driven group of wheels flexibly pivoted thereto.

2. An articulated locomotive in accordance with claim 1, wherein the power unit is provided with an additional power driven group of wheels flexibly pivoted thereto.

3. An articulated locomotive comprising a boiler carrier frame, a power driven bogie at each end of said frame and each pivotally connected thereto, one end of said frame having an extended portion which extends over one of said bogies and a power driven bogie pivotally connected to one of the first named bogies.

4. An articulated locomotive comprising a boiler carrier frame, a power driven bogie pivotally connected to each end of said carrier frame and a power driven bogie pivotally connected to the outer end of each of the first named power driven bogies.

In witness whereof I affix my signature.

ROBERT HARBEN WHITELEGG.